United States Patent
Im

(10) Patent No.: US 11,577,166 B2
(45) Date of Patent: Feb. 14, 2023

(54) METHOD FOR CONTROLLING GAMING VIRTUAL SPACE AND APPARATUS THE SAME

(71) Applicant: KRAFTON, Inc., Seongnam-si (KR)

(72) Inventor: Sungjin Im, Seoul (KR)

(73) Assignee: KRAFTON, INC., Seongnam-si (KR)

( * ) Notice: Subject to any disclaimer, the term of this patent is extended or adjusted under 35 U.S.C. 154(b) by 16 days.

(21) Appl. No.: 17/067,001

(22) Filed: Oct. 9, 2020

(65) Prior Publication Data
US 2021/0023448 A1 Jan. 28, 2021

Related U.S. Application Data

(63) Continuation of application No. PCT/KR2018/008682, filed on Jul. 31, 2018.

(51) Int. Cl.
*A63F 13/50* (2014.01)
*A63F 13/58* (2014.01)
*A63F 13/847* (2014.01)
*A63F 13/837* (2014.01)

(52) U.S. Cl.
CPC .............. *A63F 13/50* (2014.09); *A63F 13/58* (2014.09); *A63F 13/847* (2014.09); *A63F 13/837* (2014.09)

(58) Field of Classification Search
CPC ................................. A63F 13/50; A63F 13/58
See application file for complete search history.

(56) References Cited

U.S. PATENT DOCUMENTS

| 2006/0105826 A1* | 5/2006 | Wimberly, Jr. | A63F 13/24 463/7 |
| 2007/0135222 A1* | 6/2007 | Wimberly, Jr. | A63F 13/10 472/1 |
| 2012/0244945 A1* | 9/2012 | Kolo | A63F 13/58 463/42 |
| 2015/0024852 A1* | 1/2015 | Pacey | A63F 13/58 463/43 |

FOREIGN PATENT DOCUMENTS

| JP | 2008-136665 A | 6/2008 |
| JP | 2012-120755 A | 6/2012 |

OTHER PUBLICATIONS

Fandom Games, "PLAYERUNKNOWN'S Battlegrounds—How to Play [PUBG Guide]," Jul. 10, 2017, available at https://www.youtube.com/watch?v=QpIRuznOPLU (Year: 2017).*

(Continued)

*Primary Examiner* — Jay Trent Liddle
(74) *Attorney, Agent, or Firm* — Studebaker & Brackett PC

(57) ABSTRACT

Provided is a method for controlling a gaming virtual space. According to an aspect of the present disclosure, there is provided a method for controlling a gaming virtual space, comprising providing the gaming virtual space to at least one client account and allocating a location in the gaming virtual space to a character of the at least one client account; setting a safe area in the gaming virtual space, wherein the safe area is an area within a limiting border in the gaming virtual space, and wherein when the character is located outside the limiting border, additional damage is applied to the character; and indicating and adjusting the safe area.

11 Claims, 16 Drawing Sheets

(56) References Cited

OTHER PUBLICATIONS

Ahn, Jin-kyoung "A Study on Game Dynamics of Battle Royale Genre—Focus on the battlegrounds", Journal of Korea Game Society; published in Oct. 2017, vol. 17, No. 5, pp. 27-37 (See pp. 34-35). Retrieved from <URL: http://www.dbpia.co.kr/Journal/ArticleDetail/NODE07425278>.
Web document "History of 15th Update on the Battlegrounds", PUBG Website Notices; posted on Jun. 20, 2018. (See p. 4) Retrieved from <URL: http://bbs.pubg.game.daum.net/gaia/do/pubg/notice/read?articleId=510&bbsld=PN001>.
Web document "[Information] Basic Method of Game Operation, Porini's Breaking out of Dillemas", INVEN Website News; posted on Jan. 26, 2018. (See p. 4) Retrieved from <URL: http://www.inven.co.kr/webzine/news/?news=193218>.
Kim, PyeoungKee "Battle Royale Game : In Search of a New Game Genre", International Journal of Culture Technology; published on Jun. 30, 2018, vol. 2, No. 2. Retrieved from <URL: http://ijct.iacst.org>.
International Search Report issued in PCT/KR2018/008682; dated Apr. 24, 2019.
Web document ""PUBG" to start now! Explaining the flow up to "Don win" [2nd cup]"; PC games DMM communication.com; posted on Oct. 11, 2017; total 13 pages; Retrieved from <URL: https://www.famitsu.com/news/201710/11143796.html.
Web document "PUBG: Battlegrounds Events: PC 1.0 Update #15"; Steam; posted on Jun. 19, 2018; total 10 pages; Retrieved from <URL: https://steamcommunity.com/games/578080/announcements/detail/3077529898696206477.
Web document "[Information] Survive only when you are inside the white circle! A Beginner's Guide to Baggage"; INVEN news; posted on Jun. 9, 2017; pp. 1-11 Retrieved from <URL: https://www.inven.co.kr/webzine/news/news=179434&site=battlegroun.
Web document "Kakao Battlegrounds 15th update history (new map: Sanok)"; Naver blog; posted on Jun. 20, 2018; pp. 1-17; Retrieved from <URL: https://m.blog.naver.com/PostView.nhn?isHttpsRedirect=true&blogId=go07111&logNo=221303059286.
Web document "What is Battleground Magnetic Field Prediction?"; Tistory blog; posted on Jul. 25, 2017; pp. 1-8 Retrieved from <URL: https://jyux.tistory.com/1.
Web document "[Battleground] Magnitude, location and prediction of magnetic field"; TodayHumor web board; posted on Jun. 1, 2017; pp. 1-12 Retrieved from <URL: http://www.todayhumor.co.kr/board/view.php?table=gametalk&no=341894.
An Office Action; "Notice of Reasons for Refusal", mailed by the Japanese Patent Office dated Nov. 2, 2021, which corresponds to Japanese Patent Application No. 2020-555424 and is related to U.S. Appl. No. 17/067,001.
An Office Action mailed by the Korean Intellectual Property Office dated Jan. 19, 2022, which corresponds to Korean Patent Application No. 10-2020-7021825 and is related to U.S. Appl. No. 17/067,001.

\* cited by examiner

# METHOD FOR CONTROLLING GAMING VIRTUAL SPACE AND APPARATUS THE SAME

CROSS-REFERENCE TO RELATED APPLICATION

The present application is a Continuation of International Patent Application No. PCT/KR2018/008682 filed on Jul. 31, 2018. The disclosure of the above application is hereby incorporated by reference herein in its entirety.

BACKGROUND

1. Technical Field

The present invention relates to a method for controlling a gaming virtual space and an apparatus the same, and specifically to a method for adaptively controlling a gaming virtual space to improve gaming performance and effects and an apparatus the same.

2. Description of the Related Art

As the performance of personal terminals is advanced, the reality of virtual effects of games has also been remarkably increased. Recently appeared games provide a virtual space that is very close to reality to users/players. However, the level of the user/player has also improved, and thus, various methods for controlling and limiting a virtual space are required to maintain game quality.

SUMMARY

Virtual spaces with extremely high reality may be provided for games. However, the reality is not directly connected to game quality, that is, the fun of the game. For the game quality, it may be necessary to control speed and tension separately from the reality. In particular, in the case of a first person shooting game, additional control over time/space may be required in order to improve the game quality of players.

According to an aspect of the present disclosure, there is provided a method for controlling a gaming virtual space, comprising providing the gaming virtual space to at least one client account and allocating a location in the gaming virtual space to a character of the at least one client account; setting a safe area in the gaming virtual space, wherein the safe area is an area within a limiting border in the gaming virtual space, and wherein when the character is located outside the limiting border, additional damage is applied to the character; and indicating and adjusting the safe area.

According to an embodiment, wherein indicating and adjusting the safe area comprises: indicating a first limiting border representing a safe area of a first phase; indicating a second limiting border representing a safe area of a second phase; and adjusting the safe area of the first phase to the safe area of the second phase by moving the first limiting border to the second limiting border.

According to an embodiment, wherein the second limiting border is indicated after a delay time elapses after the indication of the first limiting border, wherein the movement of the first limiting border is started after a waiting time elapses after the indication of the second limiting border, and wherein the movement of the first limiting border to the second limiting border is performed during a moving time.

According to an embodiment, wherein at least one of a minimum number of effective survivors and a maximum number of effective survivors for adjustment to the safe area of the second phase is set.

According to an embodiment, further comprising: reducing at least one of the waiting time and the delay time when the number of surviving characters before the indication of the second limiting border is less than the minimum number of effective survivors.

According to an embodiment, further comprising: increasing the moving time when the number of surviving characters before the indication of the second limiting border exceeds the maximum number of effective survivors.

According to an embodiment, further comprising: when both the minimum number of effective survivors and the maximum number of effective survivors for adjustment to the safe area of the second phase are set, and the number of surviving characters before the indication of the second limiting border is not included in an effective range between the minimum number of effective survivors and the maximum number of effective survivors, instead of indicating the second limiting border and adjusting to the safe area of the second phase, indicating a third limiting border representing a safe area of a third phase having an effective range including the number of surviving characters; and adjusting the safe area of the first phase to the safe area of the third phase by moving the first limiting border to the third limiting border.

According to an embodiment, wherein the third limiting border is located based on the first limiting border.

According to an embodiment, wherein the third limiting border is located within an outer margin that shares a center with the first limiting border.

According to another aspect of the present disclosure, there is provided an apparatus for controlling a gaming virtual space, comprising: a communication unit for transmitting and receiving data wirelessly or wired; a storage unit for storing game-related data; and a processor for controlling the communication unit and the storage unit, wherein the processor is configured to: provide the gaming virtual space to at least one client account and allocating a location in the gaming virtual space to a character of the at least one client account; set a safe area in the gaming virtual space, wherein the safe area is an area within a limiting border in the gaming virtual space, and wherein when the character is located outside the limiting border, additional damage is applied to the character; and indicate and adjust the safe area.

According to still another aspect of the present disclosure, there is provided a non-transitory computer-readable storage medium, wherein at least one instructions stored in the storage medium is executed by at least one processors, and performs operations of: providing the gaming virtual space to at least one client account and allocating a location in the gaming virtual space to a character of the at least one client account; setting a safe area in the gaming virtual space, wherein the safe area is an area within a limiting border in the gaming virtual space, and wherein when the character is located outside the limiting border, additional damage is applied to the character; and indicating and adjusting the safe area.

According to the present invention, the gaming virtual space is adaptively adjusted based on the number of survivors of the game, thereby maximizing the game quality. In addition, since the adjustment speed of the gaming virtual space is adaptively adjusted based on the number of survivors of the game, the tedious aspect of the game progress and excessive compulsion of competition may be solved.`

The gaming virtual space is adjusted phase by phase, but phases may be skipped based on the number of game survivors. Therefore, amusement according to the game speed may be remarkably improved. In addition, by setting an outer margin for a location of a safe area for each phase, inequality among users that may be caused by skipping the phase may be solved.

BRIEF DESCRIPTION OF THE DRAWINGS

The accompanying drawings, which are included to further understand the present invention and which are incorporated into and constitute a part of this application, show embodiments of the present invention together with a detailed description explaining the principles of the present invention.

DETAILED DESCRIPTION OF THE EMBODIMENTS

Preferred embodiments of the present invention will be described in detail, examples of which are shown in the accompanying drawings. The detailed description below with reference to the accompanying drawings is for explaining the preferred embodiments of the present invention rather than showing only the embodiments that may be implemented according to embodiments of the present invention. The following detailed description includes details to provide a thorough understanding of the invention, but the invention does not require all of these details. The embodiments described below of the present invention do not have to be used separately. A plurality of embodiments or all embodiments may be used together, and specific embodiments may be used in combination.

Most terms used in the present invention are selected from general ones widely used in the field, but some terms are arbitrarily selected by the applicant, and their meanings will be described in detail in the following description as necessary. Therefore, the present invention should be understood based on the intended meaning of the term, not the simple name or meaning of the term.

The present invention relates to a method for providing and controlling a gaming virtual space. The present invention may also be used to control a virtual space for non-game purposes. However, in the following specification, a game of the Battle Royale genre is described as an example. The game of the Battle Royale genre refers to a game in which a plurality of users/users compete in a limited space, and the last surviving one or one team becomes the winner. In this specification, the game may be an FPS (first person shooting) game. The FPS game refers to a shooting game in which a game player plays a game from a first person view. In the case of games of the Battle Royale genre, by limiting a game space according to the passage of time, competition between users may be triggered and tension may be improved, thereby improving game quality.

Figure 1:
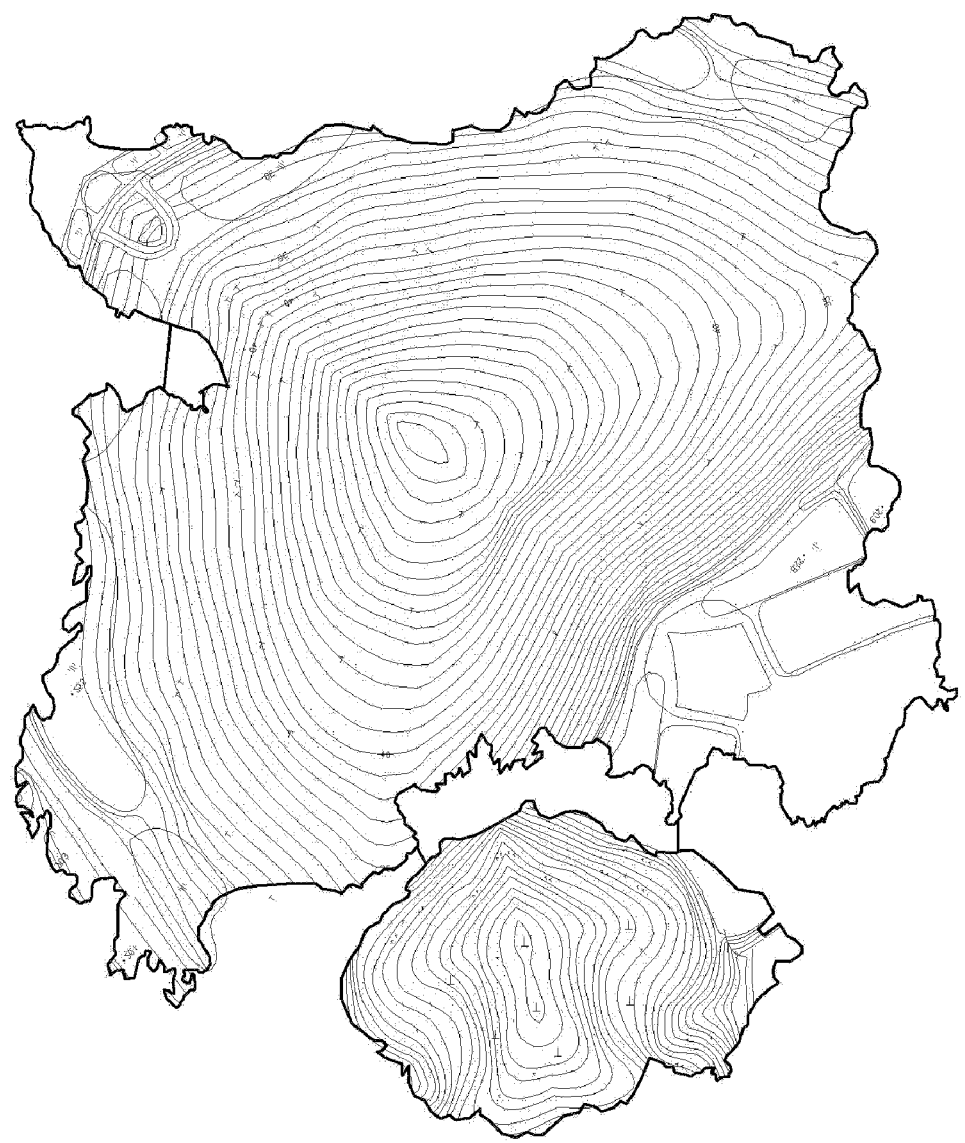
FIG. 1 shows a gaming virtual space in the form of a map according to an embodiment of the present invention.

FIG. 1 shows a gaming virtual space in the form of a map according to an embodiment of the present invention.

As the performance of a user terminal is improved, a very sophisticated and vast gaming virtual space may be provided. As shown in FIG. 1, not a conventional closed space or a narrow space, a gaming virtual space having a vast terrain may be provided. The gaming virtual space embodies various terrains. Various geographic features such as land, trees, forests, buildings, vehicles, or grass may be implemented in the gaming virtual space. The gaming virtual space is implemented in software and may be displayed on a user terminal.

Figure 2:
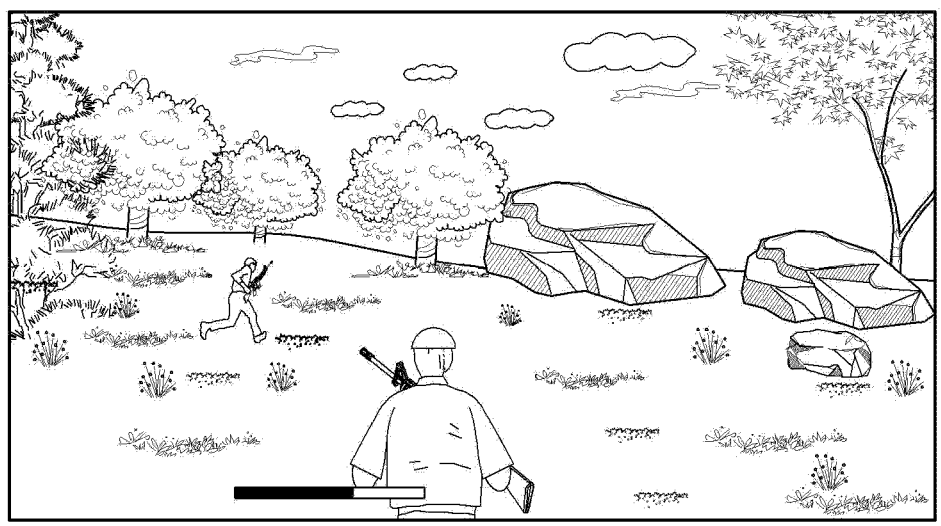
FIG. 2 shows the gaming virtual space from a user view.

FIG. 2 shows a gaming virtual space from a user character view.

The user participates in the game with a selected character. The user view represents a first person view of the character for the gaming virtual space. In the first person view, the character may or may not be visible on a screen. The first person view may reflect the direction, movement, and gaze of the character.

The character has a certain amount of HP. The HP may correspond to an abbreviation such as Health Power, Health Point, Hit Point, or the like. The HP may refer to the ability to withstand enemy attacks or environmental disasters. The effect of reducing the HP may be referred to as harm/damage. Damage is applied due to an attack of another character, or a disaster in an environment in the gaming virtual space, and the HP may decrease.

Figure 3:
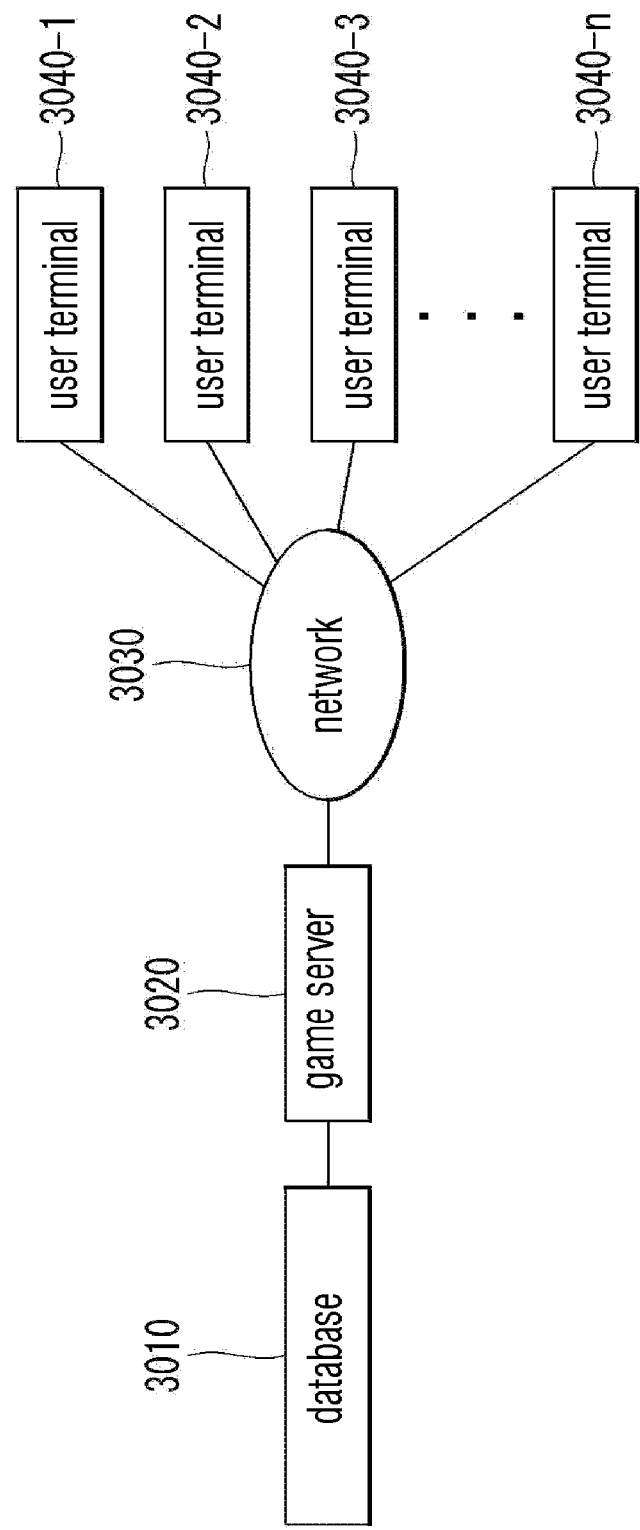
FIG. 3 shows a game system according to the embodiment of the present invention.

FIG. 3 shows a game system according to the embodiment of the present invention.

The game system of FIG. 3 includes a database 3010, a game server 3020, a network 3030, and at least one user terminal 3040.

The user terminals 3040-1~*n* may be terminals used by the user to play the game. The user terminal corresponds to any electronic device capable of displaying an image and receiving a user input for game play. In other words, the user terminal may include a display and user input means. The display and user input means of the user terminal may be integrated or may be separate. The user terminal may correspond to an electronic device such as a PC (personal computer), a notebook computer, a mobile phone, a tablet PC, or the like. Due to the nature of the FPS game, multiple users participate in the game, but one user may play the game with a virtual user.

The user terminal 3040 may establish and maintain communication with the game server 3020 through the network 3030. The network may include a plurality of networks. Data may be exchanged over the network based on various communication protocols. The network may be composed of wired or wireless or a combination thereof.

The game server 3020 may establish and maintain communication with the database 3010. FIG. 3 illustrates one database 3010 and one game server 3020. However, it is a conceptual diagram, and the number of the database 3010 and the game server 3020 may be configured differently according to implementation. The database 3010 and the game server 3020 may be included in one apparatus. An apparatus for performing the present invention may include at least one of the database 3010 and the game server 3020.

The database 3010 may include data on a game account or data on a game instance. The database 3010 may store various types of information/data for providing a game. The database 3010 may store data such as user authentication, characters, items, or game history.

The game server 3020 may exchange data between the user terminal 3040 and the database 3010 in real time. The game server 3020 may provide the user terminal 3040 with a virtual space as shown in FIGS. 1 and 2. The game server 3020 may arrange the user's location, that is, coordinates, in the virtual space as described above, and provide a view at that location to the user terminal 3040 as shown in FIG. 2.

In the present invention, an apparatus for controlling a gaming virtual space may correspond to a game server, or may correspond to a database and a game server. However, the apparatus for controlling the gaming virtual space according to the present invention is an arbitrary electronic device including a processor and a memory, and corresponds to an apparatus for embodying or implementing the method for the present invention.

The gaming virtual space may be statically limited or controlled based on a preset variable. However, in this case, since spatial changes are predicted, the game may become boring or competition in the game may be excessively triggered. For example, when competition is fierce in the beginning and many people drop out in a short time, the game may become boring because competition does not occur until the game space is sufficiently narrowed. Or, when the users have high skills, competition may not occur well in the beginning, and then competition may occur rapidly after the middle. From the perspective of e-sports broadcasting, there may be a situation where it is difficult to broadcast due to a lot of competition suddenly occurring after a boring screen at the beginning.

In order to encourage competition between the users, the present invention limits the gaming virtual space using a virtual limiting border. An area within a virtual border may be referred to as a safe area or a safe zone. As an example, the safe area may be referred to as a blue zone. In addition, the virtual limiting border may also be referred to as a magnetic field.

Figure 4:
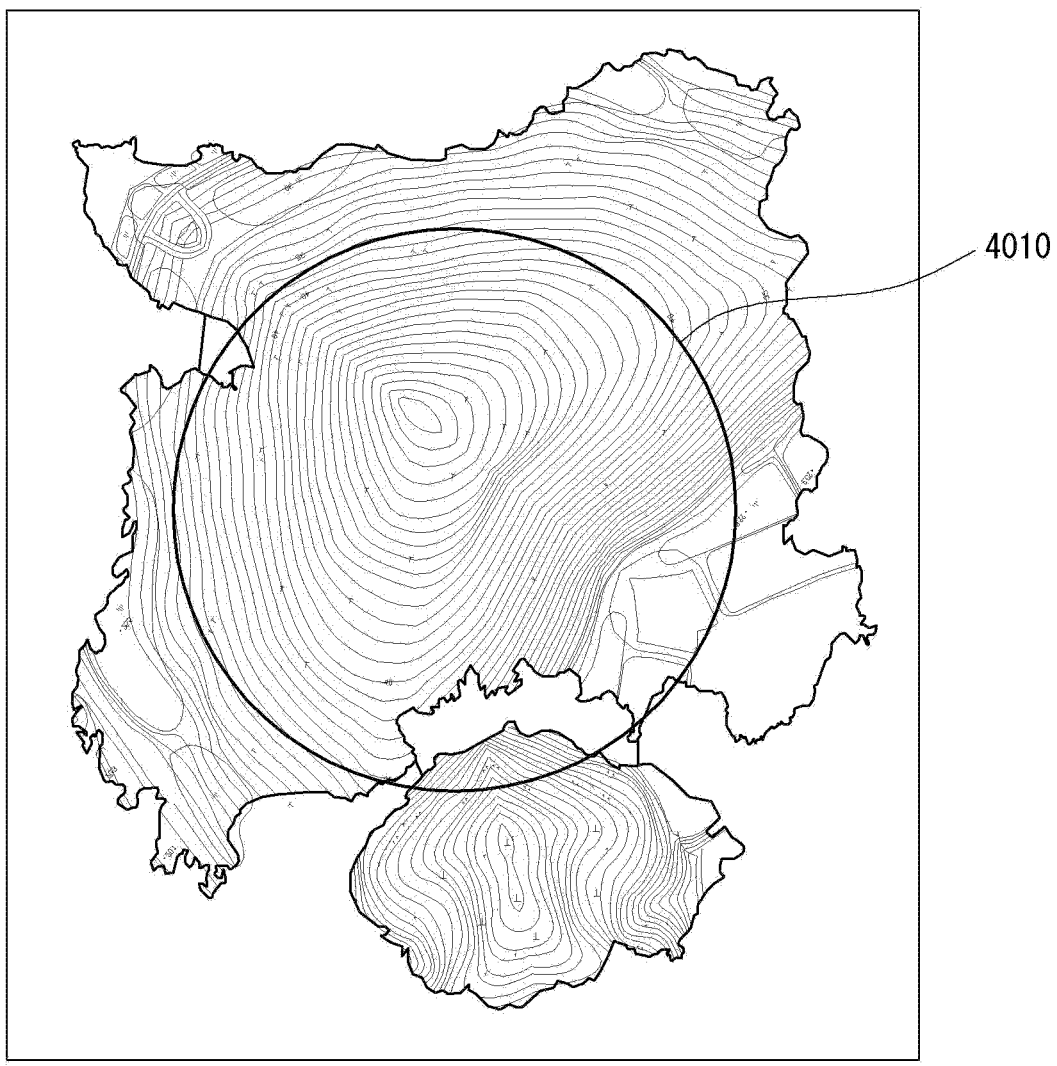
FIG. 4 shows a limiting border and safe area according to the embodiment of the present invention.

FIG. 4 shows a limiting border and safe area according to the embodiment of the present invention.

In FIG. 4, a circle 4010 of solid lines corresponds to the limiting border. The limiting border visualizes a region in which damage is applied to the character. The damage may be applied to the HP if the user character is located outside the limiting border or touches the limiting border. Or, a character located outside the limiting border or in contact with the limiting border may be immediately out after a specific time. The user may survive only by entering the limiting border, which is advantageous for playing the game. After all, the limiting border has a role of inducing competition in the game by narrowing the distance between the users. In this sense, the limiting border may also be referred to as a limiting border or a damaging border.

A character within the limiting border is damaged only by the attack of other users or the environment. Accordingly, the region within the limiting border may be referred to as a safe area.

The limiting border must be checkable by the user. If it is impossible to check, the user will receive unforeseen damage, so the fairness of the game is significantly degraded. The limiting border may be indicated as a two-dimensional closed region on a map as shown in FIG. 4. Although shown as a circle in FIG. 4, the limiting border may be shown as any single closed curve in a two-dimensional map view. Information on the limiting border may be visually or audibly indicated/provided to the user.

In FIG. 4, the limiting border is shown, and the safe area may not be separately visualized and indicated. However, since the region within the limiting border is defined as the safe area, it may be seen that the limiting border also indicates the safe area.

Figure 5:
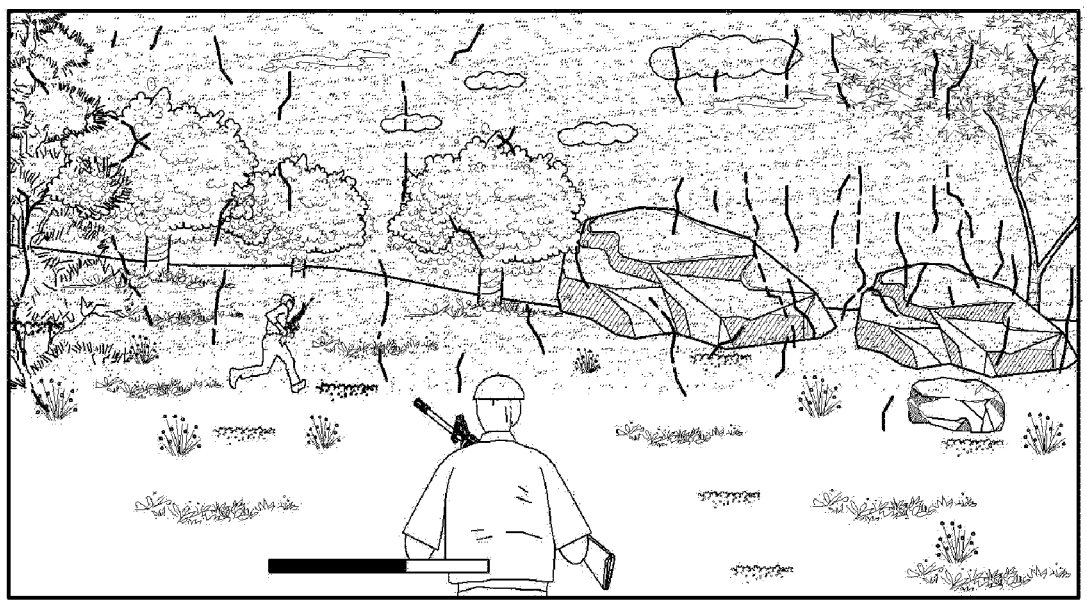
FIG. 5 shows the limiting border of a user's view according to the embodiment of the present invention.

FIG. 5 shows the limiting border of a user's view according to the embodiment of the present invention.

In FIG. 5, the limiting border is shown as a surface through which electricity flows. However, the limiting border may be visualized in any way. Since the user may check the limiting border not only in the map view as shown in FIG. 4 but also in the user view as shown in FIG. 5, the game may be played in the safe area. The limiting border may be provided to the user as a visual effect. For example, as a specific sound is provided to the user as the limiting border is closer, the user may recognize the distance to the limiting border.

The limiting border may be indicated from a specific point in time. However, depending on the user's view, the limiting border may or may not appear on the display. When the user views the map on-screen, the limiting border may be indicated on the map as shown in FIG. 4. When the user plays the game from the first person view and the map is off-screen, the limiting border may be displayed on the screen as shown in FIG. 5 only when the user is located near the limiting border and the user view contains the limiting border.

The game server may reduce an area of the safe area by gradually reducing the limiting border. However, if the reduction of the safe area is periodically reduced without adaptive reflection of a gaming situation, the problem described above may occur. In other words, at a specific point in time, if the number of users has decreased significantly and the remaining users are located at a very long distance, the game may take a long time and become boring. Accordingly, the present invention proposes a method for further improving the game quality by adaptively adjusting the limiting border and the safe area. Hereinafter, the method for adjusting the safe area by adaptively adjusting the limiting border will be described in detail.

The present invention limits the gaming virtual space by using the limiting border. A specific number of users play the game in a space of a certain size as shown in FIG. 4. A phase of the limiting border is set at a specific time interval, and the limiting border is moved phase by phase to reduce the safe area. Table 1 shows an embodiment of controlling the limiting border according to an embodiment of the present invention.

TABLE 1

| phase of limiting border | 1 | 2 | 3 | 4 | 5 | 6 | 7 | 8 | 9 |
|---|---|---|---|---|---|---|---|---|---|
| delay time (s) | 90 | 80 | 70 | 60 | 50 | 40 | 30 | 20 | 10 |
| waiting time (s) | 170 | 150 | 130 | 110 | 90 | 70 | 50 | 30 | 10 |
| moving time (s) | 120 | 120 | 120 | 90 | 90 | 90 | 60 | 60 | 30 |
| radius ratio | 0.5 | 0.5 | 0.5 | 0.5 | 0.5 | 0.5 | 0.5 | 0.5 | 0.5 |
| damage/harm (%) | 0.4 | 0.5 | 0.6 | 0.7 | 0.8 | 0.9 | 1 | 1.5 | 2 |

A description of each parameter in Table 1 is as follows:

delay time: a duration/period before the next safe area is indicated.

waiting time: a duration/period before an operation of reducing the gaming virtual space from the current safe area to the next safe area starts after the next safe area is indicated.

moving time: a duration/period during which the safe area is adjusted as the limiting border moves. In the sense of the time during which the operation of reducing the gaming virtual space from the safe area of the current phase to the safe area of the next phase is performed, it may be referred to as a reduction time.

radius ratio: a ratio of a radius of the safe area of the next phase to the safe area of the current phase.

limiting border damage: damage/harm to the character per unit time by locating the character outside the limiting border.

The safe area may be expressed as a circle, in which case its size may be expressed or set as the radius ratio. However, as described above, the limiting border surrounding the safe area may be set as an arbitrary closed curve, and an inner area may be expressed or set in units of area.

Figure 6:
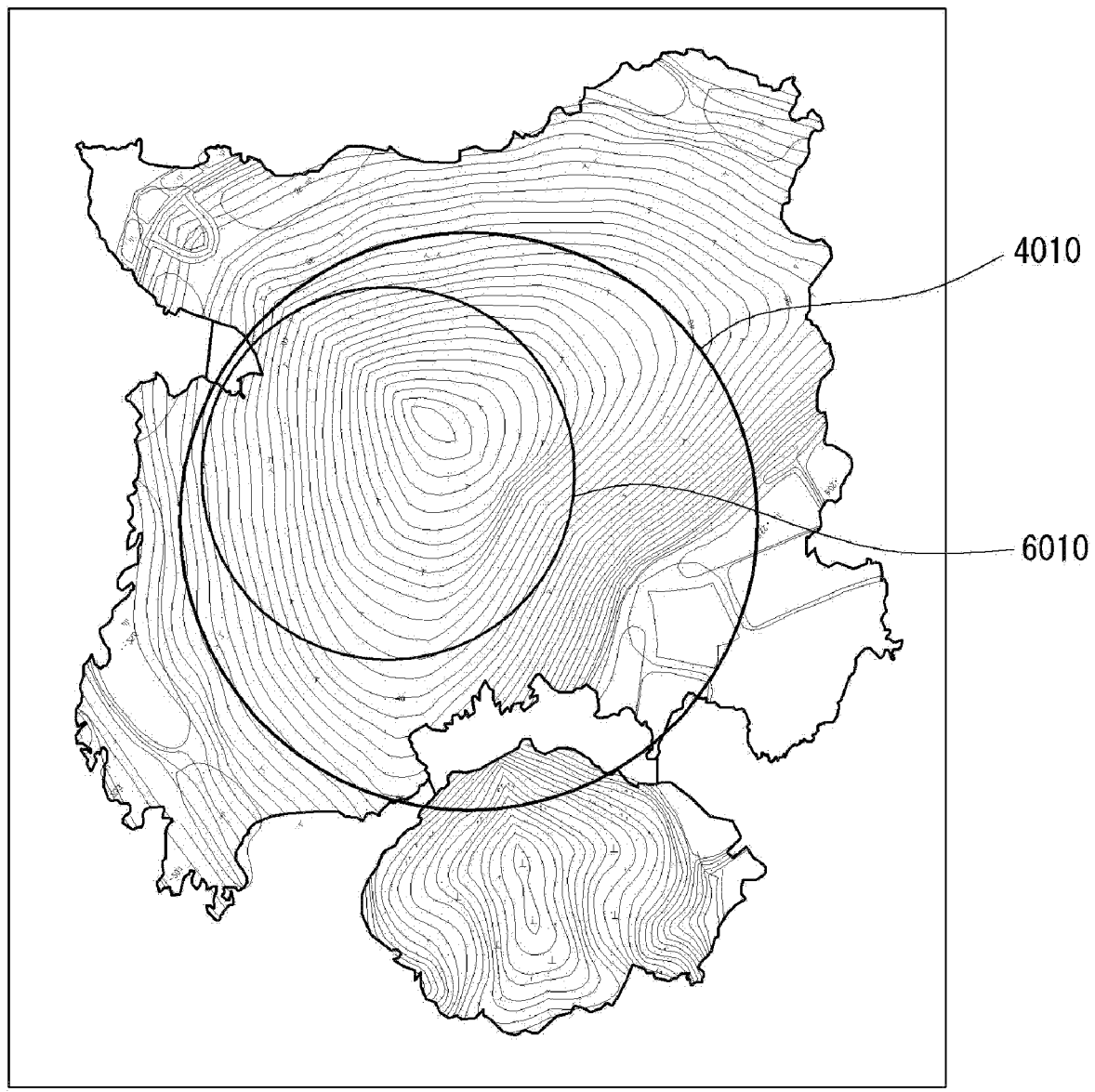
FIGS. 6 and 7 show a method for adjusting a safe area according to an embodiment of the present invention.
Figure 7:
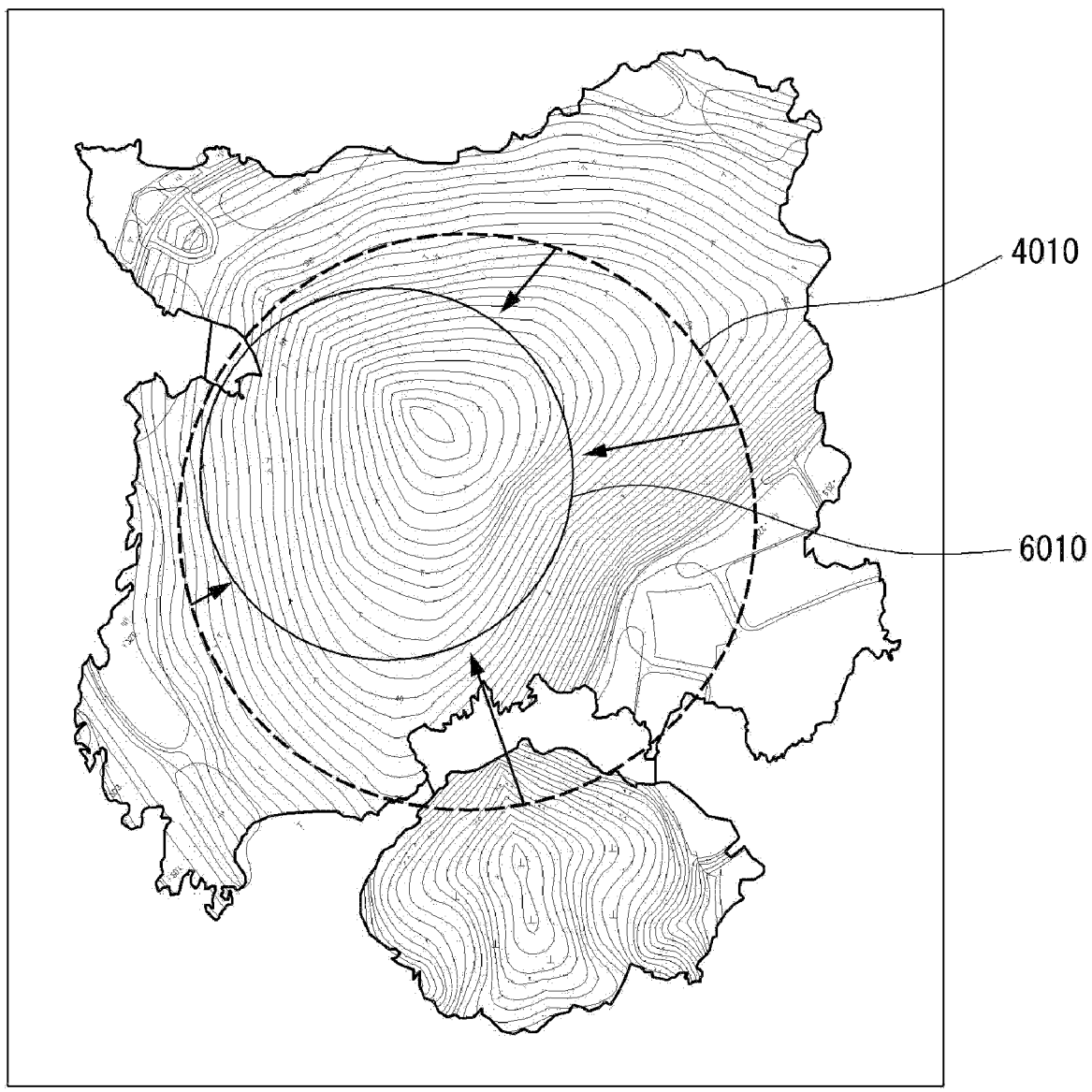

FIGS. 6 and 7 show a method for adjusting a safe area according to an embodiment of the present invention.

FIG. 4 shows the limiting border within the delay time of n phases (n is an arbitrary natural number). When a limiting border 4010 of FIG. 4 is indicated and the delay time elapses, a limiting border 6010 of phase n+1 is set and indicated as shown in FIG. 6. After the delay time elapses, the limiting border 6010 of the next phase may be indicated at the map view as shown in FIG. 6. During the waiting time, as shown in FIG. 6, the limiting border 4010 of an nth phase and the limiting border 6010 of an n+1th phase are indicated together.

When the waiting time elapses, as shown in FIG. 7, the limiting border 4010 of phase n moves to the limiting border 6010 of phase n+1. By moving the limiting border, the safe area is reduced to a size of phase n+1. When the moving time elapses, the limiting border is aligned with phase n+1, and the reduction of the safe area is completed.

In the present invention, when the delay time elapses in each game progress phase, a location of the safe area of the next phase is indicated, and the movement of the border is not performed during the waiting time. However, information on the safe area such as the waiting time is provided to the user. As the user progresses through the game, he or she may establish a strategy for obtaining a movement path or item and proceed with the game. After the waiting time has elapsed, the limiting border moves, and the user is forced to move to the safe area of the next phase. Therefore, it is possible to encourage competition and improve tension and fun of the game by forcing the users to continuously play in a narrower limited space.

Figure 8:
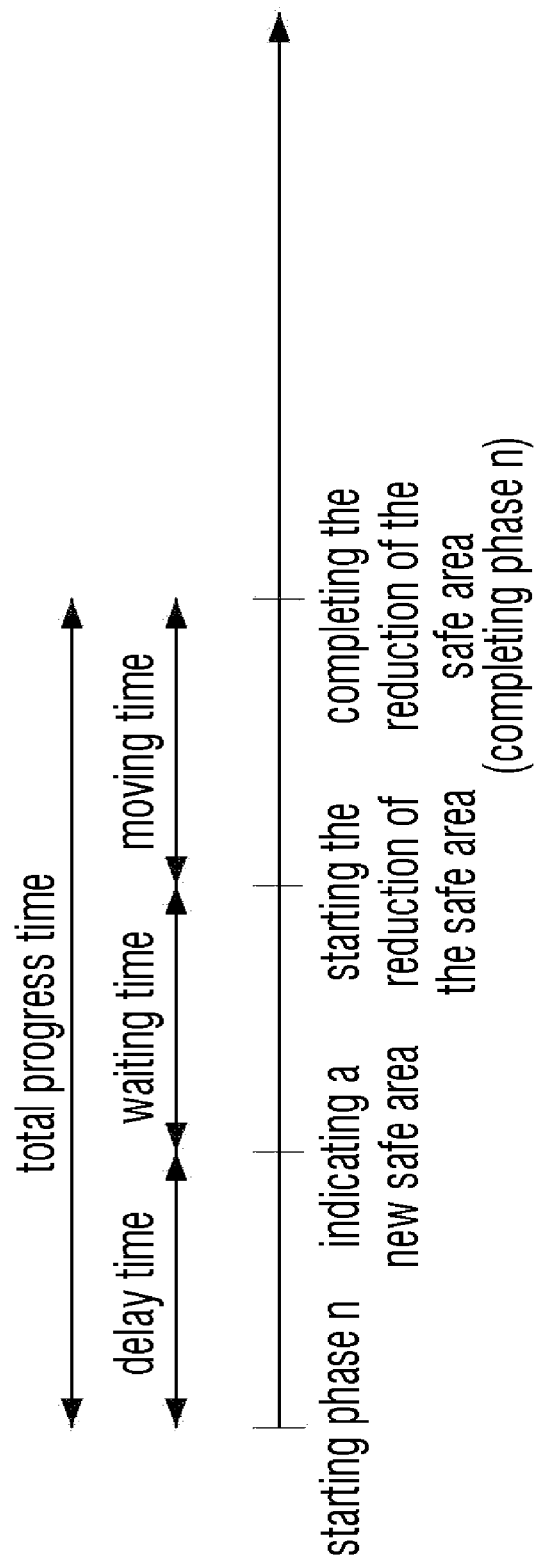
FIG. 8 shows a timeline for the method for adjusting the safe area according to the embodiment of the present invention.

FIG. 8 shows a timeline for the method for adjusting the safe area according to the embodiment of the present invention.

FIG. 8 shows a progress time of phase n in the adjustment of the safe area. The total progress time of phase n includes the delay time, the waiting time, and the moving time.

When phase n starts, the game proceeds in a state where the safe area of phase n is indicated as shown in FIG. 4. When the delay time elapses, as shown in FIG. 6, the safe area of phase n+1 is indicated. During the waiting time, the safe area of phase n and the safe area of phase n+1 are displayed on the map together. When the waiting time elapses, the safe area is reduced as shown in FIG. 7. During the moving time, the limiting border moves so that the safe area of phase n is adjusted to the safe area of phase n+1.

The movement of characters occurs in earnest during the moving time rather than the delay time and the waiting time. In other words, due to the reduction of the safe area, a density of survivors relative to an area increases rapidly, and competition among the users is triggered.

Figure 9:
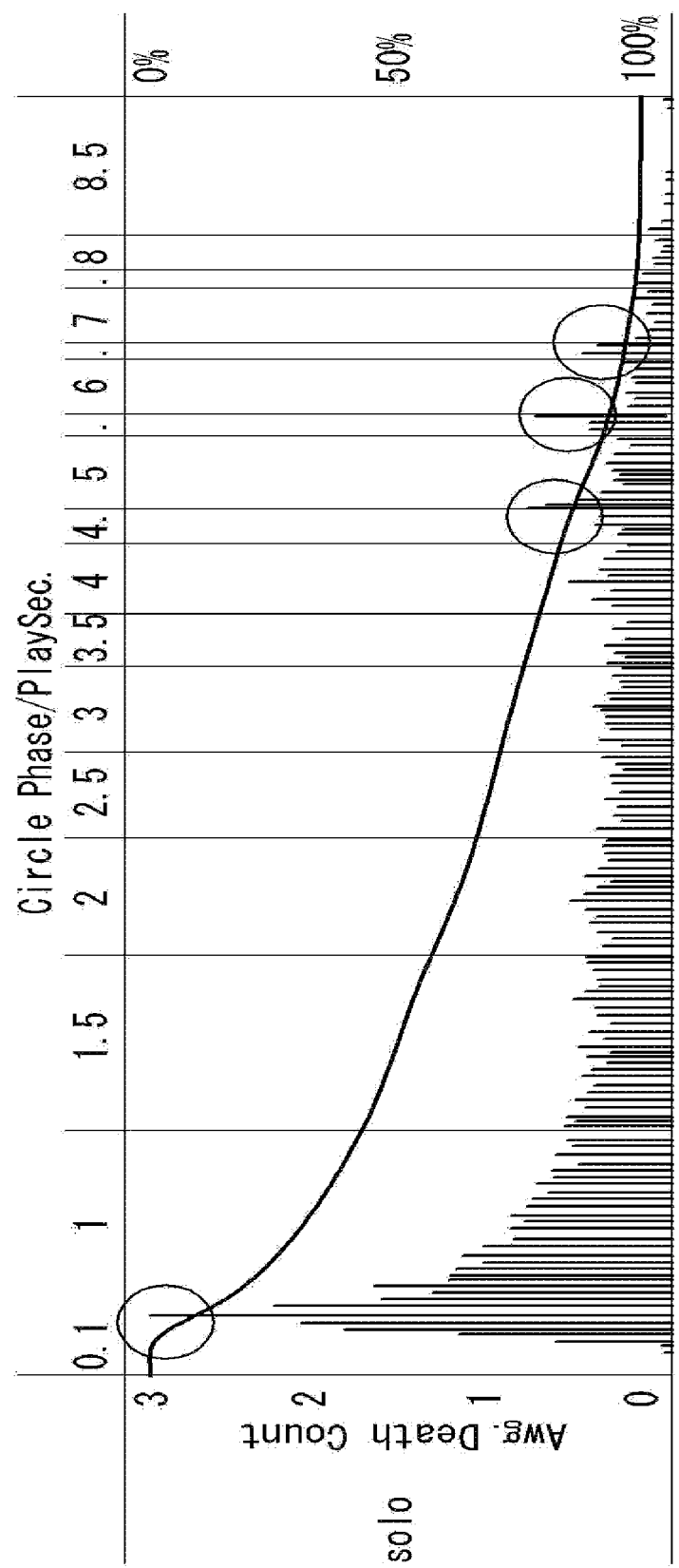
FIG. 9 shows the number of game deaths per 10 seconds per phase according to an embodiment of the present invention.

FIG. 9 shows the number of game deaths per 10 seconds per phase according to an embodiment of the present invention. At each phase, it may be seen that the number of deaths per 10 seconds increases at the time corresponding to the moving time. In the game of the Battle Royale genre, movement involves risk, and battles occur during the moving time. The delay time and the waiting time may be used for maintenance, preparation for the next phase, and establishment of a strategy. Accordingly, the present invention may dynamically control the delay time, the waiting time, and the moving time in order to smoothly progress the game and maintain the tension of the game.

Hereinafter, a method for dynamically adjusting a progress time of the adjustment of a safe area will be described.

As described above, the adjustment of the safe area is performed through a plurality of phases, and each phase is performed based on the progress time. The progress time of each phase includes the delay time, the waiting time, and the reduction time. The present invention proposes a method for setting an appropriate number of people participating in a game for each phase and dynamically adjusting a progress time based on the effective number of people. For example, when users survive less than a minimum effective number set in a specific phase, a density of users relative to an area is lowered. Therefore, in this case, it is possible to promote competition and improve game speed by shortening the delay time, the waiting time, or the reduction time. Conversely, when the users survive more than a maximum effective number set in a specific phase, the density of users relative to the area increases. Therefore, in this case, the game speed may be properly maintained by increasing the delay time, the waiting time, or the reduction time.

Table 2 shows the method for dynamically adjusting the progress time according to an embodiment of the present invention.

In the example of Table 2, when phase 1 and phase 2 starts, the effective number of people in phase 2 is set to 70-80%. When 100 users start the game, the effective number of people in phase 2 is 70 to 80. When 70 to 80 users survive at the start of phase 2, phase 2 proceeds according to the delay time (80), the waiting time (150), and the moving time (120) of phase 2. The effective number of people in the table means the number of survivors.

TABLE 2

| magnetic field | 1 | 2 | 3 | 4 | 5 | 6 | 7 | 8 | 9 |
|---|---|---|---|---|---|---|---|---|---|
| delay time (s) | 90 | 80 | 70 | 60 | 50 | 40 | 30 | 20 | 10 |
| waiting time (s) | 170 | 150 | 130 | 110 | 90 | 70 | 50 | 30 | 10 |
| reduction time (s) | 120 | 120 | 120 | 90 | 90 | 90 | 60 | 60 | 30 |
| radius ratio | 0.5 | 0.5 | 0.5 | 0.5 | 0.5 | 0.5 | 0.5 | 0.5 | 0.5 |
| magnetic field damage | 0.4 | 0.5 | 0.6 | 0.7 | 0.8 | 0.9 | 1 | 1.5 | 2 |
| minimum effective number of people (min) | 80% | 70% | 60% | 50% | 40% | 30% | 20% | 10% | 0% |
| less than minimum effective number of people dynamic delay time | 30 | 30 | 30 | 20 | 20 | 20 | 10 | 10 | 10 |
| less than minimum effective number of people dynamic waiting time | 60 | 60 | 60 | 40 | 40 | 40 | 20 | 20 | 10 |
| maximum effective number of people (max) | 90% | 80% | 70% | 60% | 50% | 40% | 30% | 20% | 10% |
| exceeding maximum effective number of people dynamic reduction time | 150 | 150 | 150 | 120 | 120 | 120 | 90 | 90 | 60 |

When there are 65 surviving people which is less than 70% at the start of phase 2, the delay time (90 seconds) may be adjusted to a dynamic delay time (30 seconds) or the waiting time (170 seconds) may be adjusted to a dynamic wait time (60 seconds). When there are 85 survivors, which is 80% or more at the start of phase 2, the reduction time (120 seconds) may be adjusted to a dynamic reduction time (150 seconds). Therefore, the game speed may be appropriately adjusted according to the number of survivors.

A preset value as shown in Table 2 may be applied to the dynamic delay time, the dynamic waiting time, or the dynamic reduction time. As another embodiment, the dynamic delay time, the dynamic waiting time, or the dynamic reduction time may be determined based on a range of the effective number of people and the current number of survivors. For example, when a difference between the range of the effective number of people and the current number of survivors is large, a change width increases, and when the difference is small, the dynamic delay time, the dynamic waiting time, or the dynamic reduction time may be set so that the change width is small.

Compared to an appropriate survivor density range, a density value outside the range may be used as input to calculate the dynamic delay time, the dynamic waiting time, or the dynamic reduction time. As an input of a function for calculating each of the dynamic delay time, the dynamic waiting time, or the dynamic reduction time, the number of people outside a preset range, or population density relative to an area may be used For example, in Table 2, a maximum effective number of people in phase 3 is 70%. When the current number of survivors is 77%, the percentage of people outside the range of the effective number of people (60-70%) is 7%. 7% is a value exceeding 10% compared to 70% of the range of the effective number of people. Therefore, the moving time of phase 3 is also increased by 10%, and may be adjusted from 150 seconds to 165 seconds.

Figure 10:
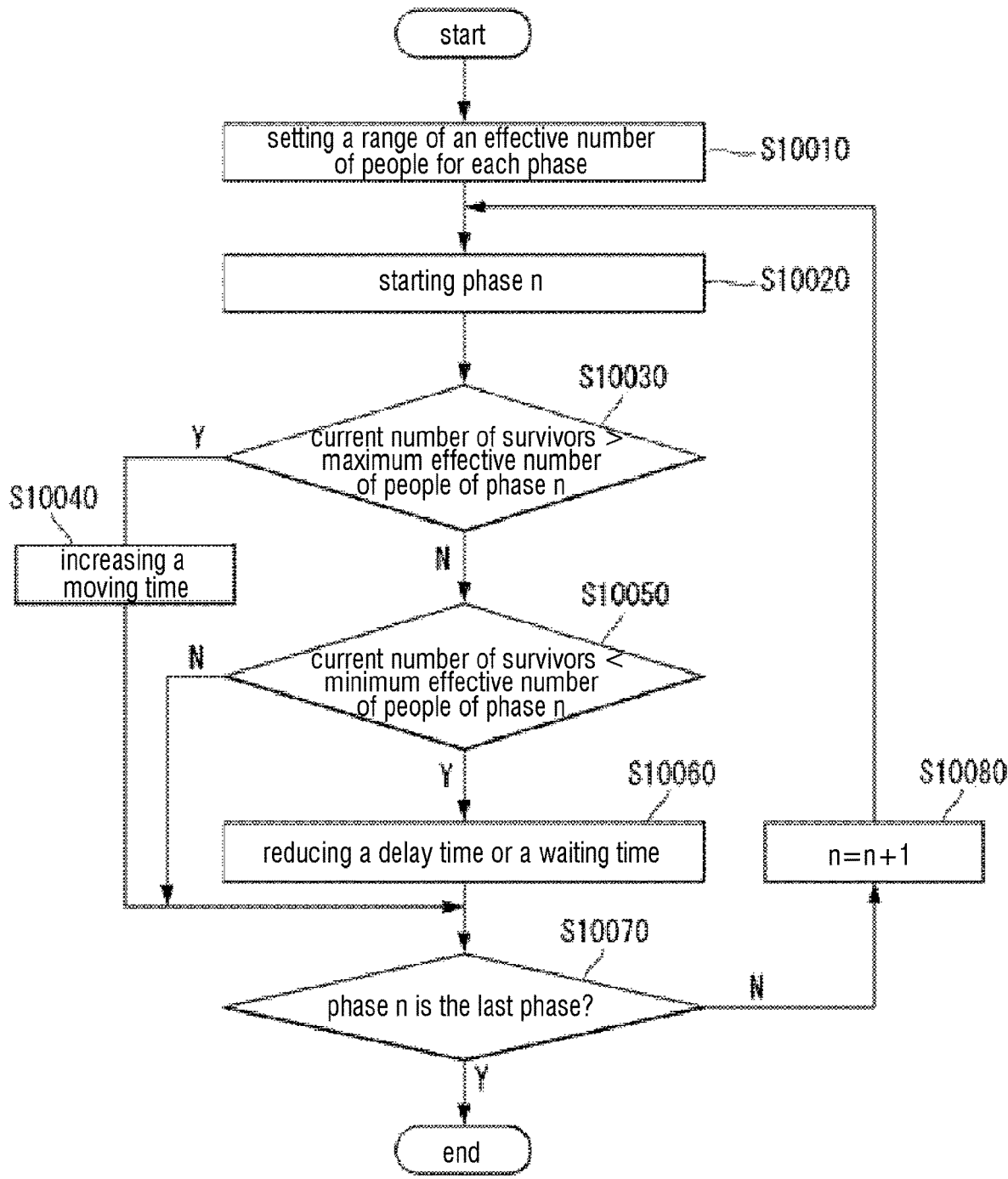
FIG. 10 is a flowchart illustrating a method for dynamically adjusting a progress time of safe area adjustment according to an embodiment of the present invention.

FIG. 10 is a flowchart illustrating a method for dynamically adjusting a progress time of safe area adjustment according to an embodiment of the present invention.

FIG. 10 shows a flow chart showing the method described above with respect to Table 2, but it is not limited to the flow chart of FIG. 10 of the present invention.

The game server may set the range of the effective number of people for each phase (S10010). As shown in the embodiment of Table 2, for each phase of adjusting the safe area, the game server may set the range of the effective number of people for each phase.

The game server may start adjusting the safe area of phase n over time (S10020).

When the number of survivors is greater than the maximum effective number of people of phase n (S10030), the game server may increase the moving time (S10040). When the current number of survivors is less than the minimum effective number of phase n (S10050), the game server may shorten at least one of the delay time or the waiting time (S10060). In an embodiment of the present invention, steps S10030 to S10040 and steps S10050 to 10060 may be selectively performed or may be performed in a different order.

When phase n is not the last phase (S10070), the game server performs the next phase (S10080).

As another embodiment of the method for dynamically controlling the progress time of the adjustment of the safe area adjustment, a method for omitting a specific phase may be used. Based on the effective number of people and the current number of people, at least one specific phase may be omitted. Hereinafter, a method for controlling a progress of a game by skipping a specific phase of adjusting a safe area will be described.

Table 3 shows a method for omitting a process phase according to an embodiment of the present invention.

In the example of Table 3, the minimum effective number of people to start phase 2 after the end of phase 1 is 70%. When the number of survivors is 65% after the end of phase 1, phase 2 is omitted. The range of the effective number of people for starting phase 3 is 60-70%. Therefore, in the embodiment of Table 3, when the number of survivors is 65% after the end of phase 1, phase 3 starts after phase 1.

TABLE 3

| magnetic field | 1 | 2 | 3 | 4 | 5 | 6 | 7 | 8 | 9 |
|---|---|---|---|---|---|---|---|---|---|
| delay time | 90 | 80 | 70 | 60 | 50 | 40 | 30 | 20 | 10 |
| waiting time | 170 | 150 | 130 | 110 | 90 | 70 | 50 | 30 | 10 |
| moving time | 120 | 120 | 120 | 90 | 90 | 90 | 60 | 60 | 30 |
| radius ratio | 0.5 | 0.5 | 0.5 | 0.5 | 0.5 | 0.5 | 0.5 | 0.5 | 0.5 |
| magnetic field damage | 0.4 | 0.5 | 0.6 | 0.7 | 0.8 | 0.9 | 1 | 1.5 | 2 |
| minimum effective number of people (min) | 80% | 70% | 60% | 50% | 40% | 30% | 20% | 10% | 0% |
| maximum effective number of people (max) | 90% | 80% | 70% | 60% | 50% | 40% | 30% | 20% | 10% |

Phases may be omitted one by one or a plurality of phases may be omitted. For example, the number of survivors could be 45% after the end of phase 1. 45% corresponds to a starting condition of phase 5, that is, the range of the effective number of people for starting phase 5. Therefore, phase 5 may begin immediately after phase 1.

When a minimum effective number of people to start each phase is set and the number of survivors is less than that number, the corresponding phase may be omitted. By omission of phases, the game quality is improved and the tension of the game is maintained, so that boredom may be minimized.

When the plurality of phases are omitted, the moving time may be set by summing the moving times of the plurality of skipped phases. In the example of Table 3, when phases 2 and 3 are omitted and phase 4 starts, the moving time may be 330 seconds. This is to ensure the moving time of the users because the safe area is rapidly reduced. In addition, even if the plurality of phases is omitted, an outer margin may be applied to reduce unfairness of a moving distance between the users.

Figure 11:
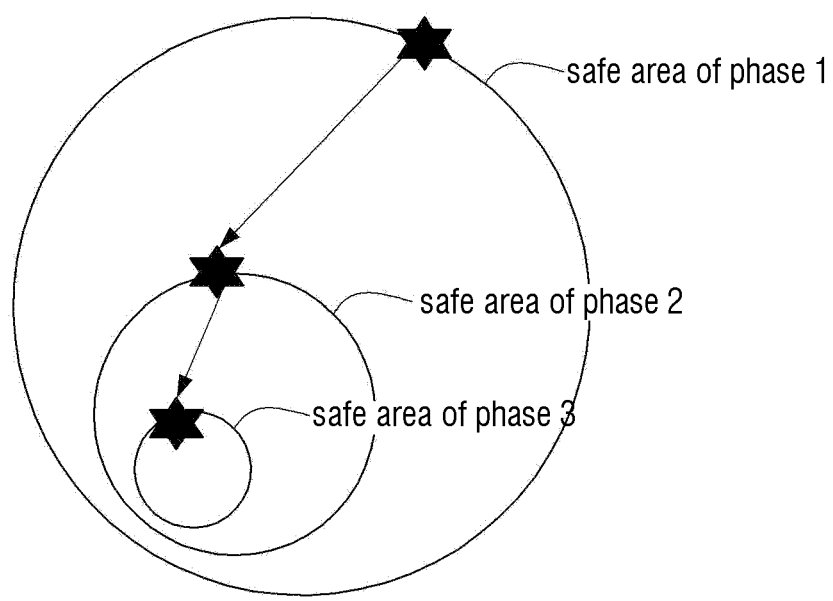
FIGS. 11 to 13 show a method for adjusting an outer margin according to an embodiment of the present invention.
Figure 12:
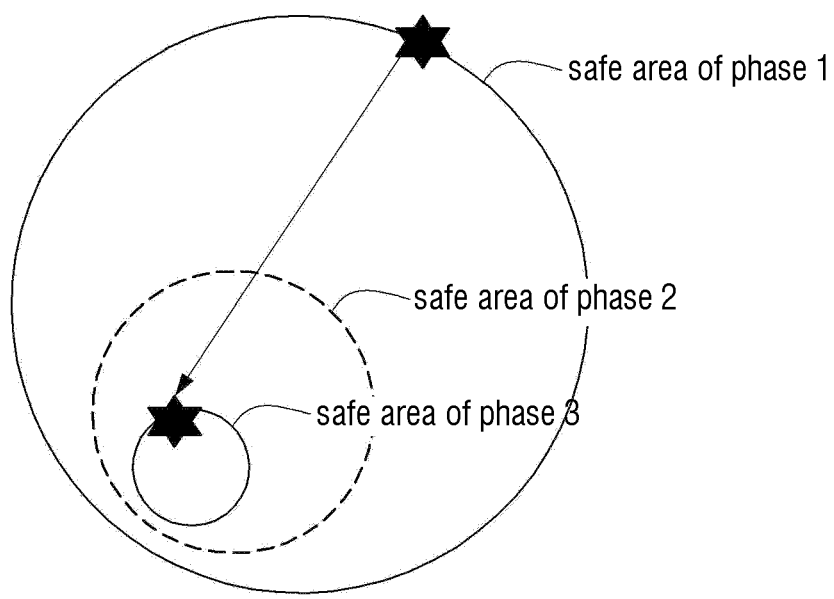
Figure 13:
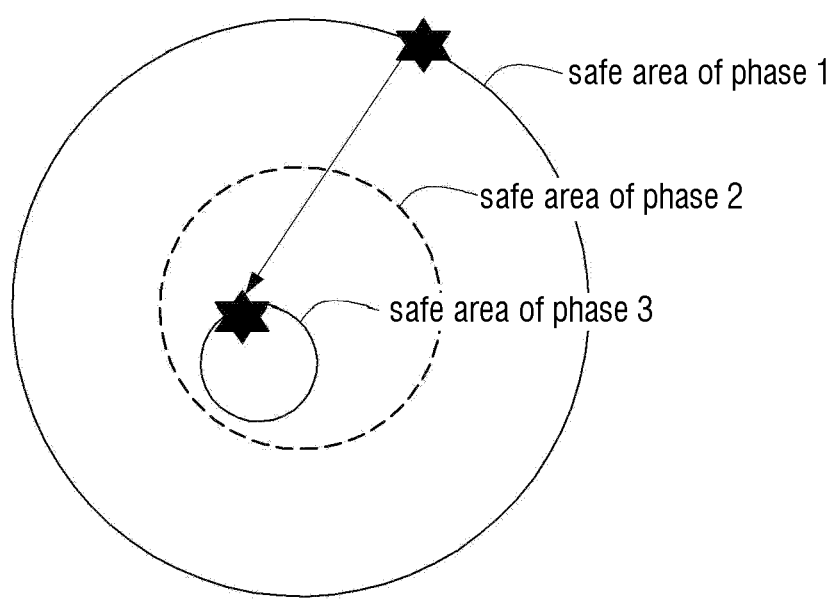

FIGS. 11 to 13 show a method for adjusting an outer margin according to an embodiment of the present invention.

FIG. 11 shows an embodiment in which the adjustment of the safety zone of phases 1 to 3 is sequentially performed without omission of phases. The location of the safe area may be randomly determined. As in the example of FIG. 10, even if the location of the safe area of phase 3 is determined to the lower left of the safe area of phase 1, the moving time for each phase is provided, so it is difficult to regard it as unfair for each user.

FIG. 12 shows an embodiment in which phase 2 is omitted and phase 3 starts immediately after phase 1. In the embodiment of FIG. 12, a user located in the upper right area of the safe area of phase 1 has to move a long distance in a short time compared to other users, and thus is more likely to be attacked than other users. Therefore, the fairness of the game between the users may deteriorate.

FIG. 13 shows an embodiment in which phase 2 is omitted and phase 3 starts immediately after phase 1. In order to solve the problem of the embodiment of FIG. 13, the present invention may arrange the safe area of phase 2 in a concentric circle with phase 1, and set the safe area of phase 3 in the safe area of phase 2. The safe area of phase 3 may be set to a random location within the safe area of phase 2. In the embodiment of FIG. 13, by preventing the safe area of the phase following the skipped phase from significantly deviating from the center of the safe area of the phase before the skipping, it is possible to minimize unfairness between the users.

When the plurality of phases are omitted, the safe area with the largest safe area among the skipped phases may be used as the outer margin. For example, when phases 2 to 4 are omitted, the safe area of phase 2 may be set as the outer margin, and the safe area of phase 5 may be located therein. The outer margin may correspond to an arbitrary border that shares the center with the largest safe area among the omitted phases.

Among variables related to the safe area, phase 2 is omitted, and phase 3 may proceed immediately after phase 1. In this case, the delay time, waiting time, and damage of the preset phase 3 are used, but in terms of the moving time and the radius ratio, a setting of phase 2 is considered. However, in the present invention, the safe area of the omitted phase 2 is located in the center of the safe area before the omission, and the safe area of the omitted phase 2 is set as the outer margin. Then, the safety zone of phase 3 is randomly located within the outer margin.

Figure 14:
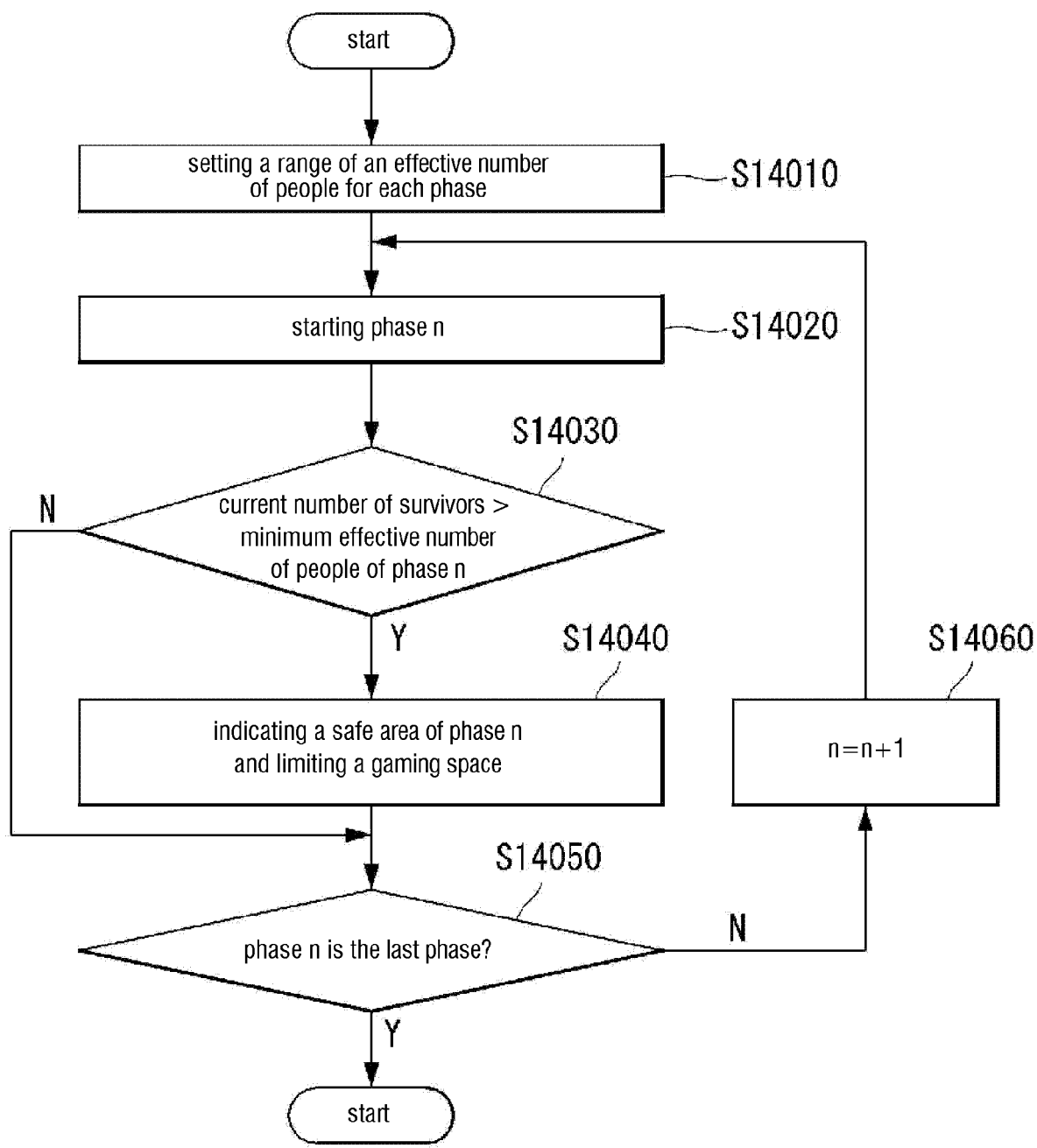
FIG. 14 is a flowchart illustrating a method for adaptively omitting phases of safe area adjustment according to an embodiment of the present invention.

FIG. 14 is a flowchart illustrating a method for adaptively omitting phases of safe area adjustment according to an embodiment of the present invention.

FIG. 14 is a flowchart illustrating the method described above with respect to Table 3, but it is not limited to the flowchart of FIG. 14 of the present invention.

The game server may set the range of the effective number of people for each phase (S14010). As shown in the embodiment of Table 3, for each phase of adjusting the safe area, the game server may set the range of the effective number of people for each phase.

The game server may start adjusting the safe area of phase n over time (S14020).

When the current number of survivors is greater than the minimum effective number of people of phase n (S14030), the game server may indicate the safe area of phase n and limit the game space (S14050). When the current number of survivors is less than the minimum effective number of phase n (S14030), the game server performs the next phase (S14070) if phase n is not the last phase (S14060).

In FIG. 14, the game server adjusts the safe area when it reaches a phase that meets the minimum effective number of people. Therefore, as described above, the phase that does not meet the minimum effective number of people is omitted. The adjustment of the safe area is performed based on the aforementioned outer margin.

Figure 15:
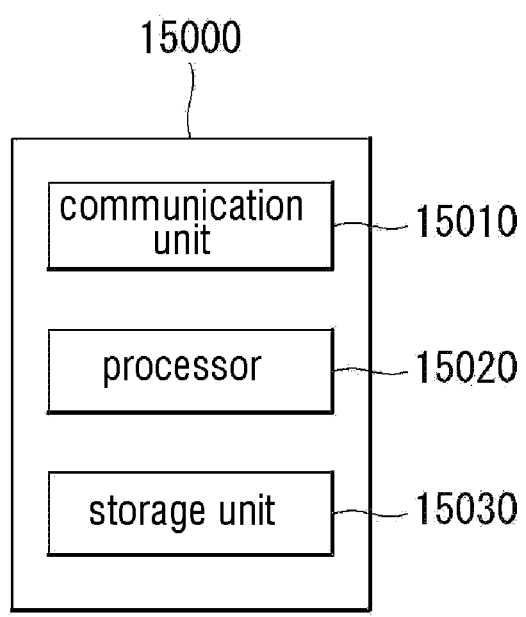
FIG. 15 shows an apparatus for controlling a gaming virtual space according to an embodiment of the present invention.

FIG. 15 shows an apparatus for controlling a gaming virtual space according to an embodiment of the present invention.

In the present specification, the apparatus for controlling the gaming virtual space may be referred to as a game server. The game server refers to any electronic device that embodies and implements the method for controlling the gaming virtual space of the present invention. The game server may correspond to any fixed/mobile electronic device including the configuration of FIG. 15.

The game server 15000 includes a communication unit 15010, a processor 15020, and a storage unit 15040.

The communication unit 15010 may be connected to the processor 15020 to transmit/receive wireless/wired signals. The communication unit 15010 may transfer data conveyed from the processor 15020 or may convey received data to the communication unit. In the present invention, the communication unit 15010 may transfer data corresponding to the gaming virtual space to a client account. In addition, the communication unit 15010 may transfer data for executing the method for the present invention to the client account. Further, the communication unit 15010 may receive data of the client account playing a game and convey it to the processor 15020.

The storage unit 15030 is connected to the processor 15020 and stores various information for driving the processor 15020. The storage unit 15030 may store various data, information, instances, or instructions for providing the gaming virtual space. The storage unit 15030 may be connected to an external database to the game server 15000 to provide data to the game server 15000.

The processor 15020 may be connected to the communication unit 15010 and the storage unit 15030 to perform operations according to various embodiments of the present invention according to the above-described drawings and descriptions. At least one of a module, data, program, or software implementing the method for controlling the gaming virtual space control according to various embodiments of the present invention may be stored in the storage unit 15030 and executed by the processor 15020.

The processor 15020 of the game server 15000 may perform the method for controlling the gaming virtual space described in the present invention. The method for controlling the gaming virtual space in the game server 15000 will be described below.

Figure 16:
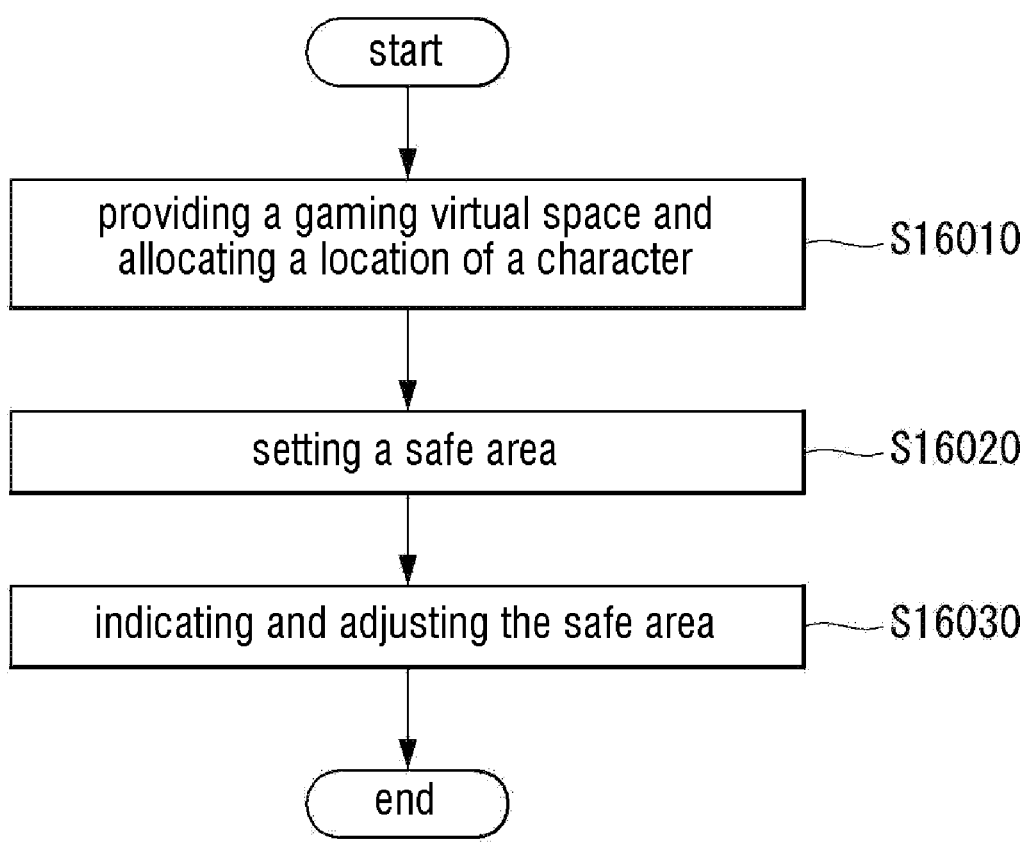
FIG. 16 shows a method for controlling a gaming virtual space according to an embodiment of the present invention.

FIG. 16 shows a method for controlling a gaming virtual space according to an embodiment of the present invention.

The game server may provide a gaming virtual space to at least one client account, and may allocate a location in the gaming virtual space to a character of at least one client (S16010).

The gaming virtual space is transferred as data to a user terminal accessed by the client account. Then, the location of the character of the client account may be mapped to coordinates in the gaming virtual space.

The game server may set a safe area (S16020).

The safe area corresponds to an area within a limiting border in the gaming virtual space. When the character touches, approaches, or is located outside the limiting border, additional damage may be applied to the character. As an example, the character may die due to the limiting border. Parameters related to the safe area may be set. The maximum effective number of people, the minimum effective number of people, or the range of the effective number of people as described above may be set. The safe area may be set as a plurality of phases and a parameter for each phase.

The game server may indicate and adjust the safe area (S16030).

The game server indicates the safe area by the limiting border, and may adjust the safe area by moving the limiting border.

Figure 17:
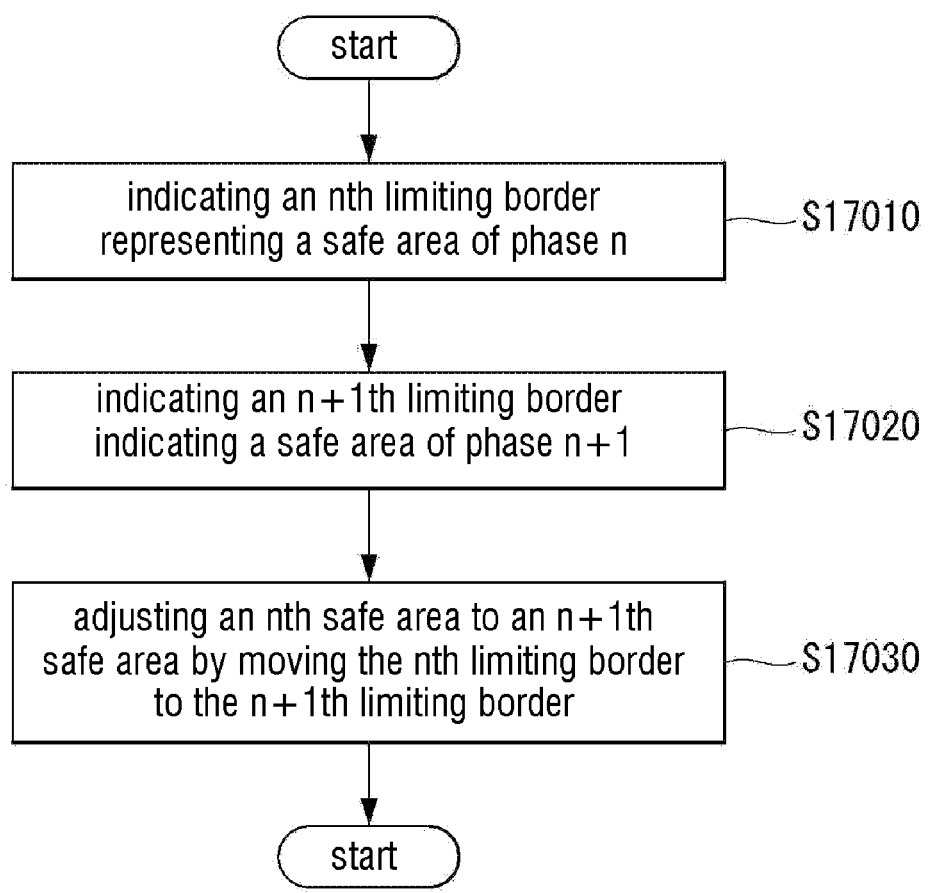
FIG. 17 shows a method for indicating and adjusting a safe area at a specific phase in the method for controlling the gaming virtual space according to the embodiment of the present invention.

FIG. 17 shows a method for indicating and adjusting a safe area at a specific phase in the method for controlling the gaming virtual space according to the embodiment of the present invention.

The phase of indicating and changing the safe area of FIG. 16 may be performed as in the flowchart of FIG. 17.

The game server may indicate an nth limiting border representing the safe area of phase n(S17010). n is any natural number.

The nth limiting border does not have to be displayed immediately. When the nth limiting border is displayed, it may mean that the user is in a state in which the nth limiting border and the safe area of phase n may be checked. In other words, when the nth limiting border is indicated by the game server, the user may check the nth limiting border from the map or the user view. In the flowchart of FIG. 17, the indication of the nth limiting border may mean that an n−1th limiting border moves and is aligned with the nth limiting border. The indicated nth limiting border is a valid limiting border, and additional damage may be applied based on the border.

The game server may indicate an n+1th limiting border indicating a safe area of phase n+1 (S17020).

The n+1th limiting border is a temporary limiting border. In the n+1th limiting border, damage is effectively applied only when phase n is completed. In other words, the limiting border of phase n+1 indicated in phase n is to inform the user of the safe area of the next phase.

The game server adjusts an nth safe area to an n+1th safe area by moving the nth limiting border to the n+1th limiting border (S17030).

When the nth limiting border is added to the n+1th limiting border, the n+1th limiting border becomes a valid limiting border. The n+1th limiting border becomes a limiting border to which damage is applied.

As described in FIG. 8, the step of indicating and adjusting the safe area includes the delay time, the waiting time, and the moving time. The game server indicates the n+1th limiting border after the delay period has elapsed from the indication of the nth limiting border. The game server starts moving the nth limiting border after the waiting time elapses after indicating the n+1th limiting border. The movement of the nth limiting border to the n+1th limiting border is performed during the moving time.

As in the embodiment described above, at least one of the minimum number of effective survivors and the maximum number of effective survivors for adjustment to the safe area of the n+1th phase may be set. The minimum number of effective survivors and the maximum number of effective survivors may be set as ranges.

As described above with reference to Table 2 and FIG. 10, the game server may reduce at least one of the waiting time and the delay time when the number of surviving characters before the indication of the n+1th limiting border is less than the minimum number of effective survivors. The waiting time or the delay time may be reduced and set before the indication of the n+1th limiting border or before the indication of the nth limiting border. The game server may increase the moving time when the number of surviving characters before the indication of the n+1th limiting border exceeds the maximum number of effective survivors. The moving time may be increased and set before the indication of the n+1th limiting border or before the indication of the nth limiting border.

As described above with respect to Table 3 and FIGS. 11 to 14, the adjustment of the safe area in a specific phase may be omitted. Both the minimum number of effective survivors and the maximum number of effective survivors for the change to the safe area of the n+1th phase are set, and the number of surviving characters before the indication of the n+1th limiting border may not be included in an effective range between the set minimum number of effective survivors and the set maximum number of effective survivors. In this case, the game server indicates an n+mth limiting border and adjusts to a safe area of an n+mth phase, instead of indicating the n+1th limiting border and adjusting the safe area of the n+1th phase. m is any natural number. For explanation, m may be a natural number, especially greater than 1. The indication of the n+mth limiting border and the adjustment to the safe area of the n+mth phase may include indicating the n+mth limiting border representing the safe area of the n+mth phase having the effective range including the number of surviving characters; and adjusting the safe area of the nth phase to the safe area of the n+mth phase by moving the nth limiting border to the n+mth limiting border.

As described above with respect to FIGS. 11 to 13, the limiting border of phase n+m may be located based on the nth limiting border. The n+mth limiting border may be located within an outer margin that shares a center with the nth limiting border.

The method for controlling the gaming virtual space in the present invention may be performed by data stored in a non-transitory storage medium. At least one instruction stored in the non-transitory storage medium may be executed by at least one processor to implement the above-described embodiments of the present invention.

The embodiments described above are those in which components and features of the present invention are combined in a predetermined form. Each component or feature should be considered optional unless explicitly stated otherwise. Each component or feature may be implemented in a form that is not combined with other components or features. In addition, it is also possible to constitute the embodiments of the present invention by combining some components and/or features. The order of operations described in the embodiments of the present invention may be adjusted. Some configurations or features of one embodiment may be included in other embodiments, or may be replaced with corresponding configurations or features of other embodiments. It is obvious that claims that do not have an explicit citation relationship in the claims may be combined to constitute an embodiment or may be included as a new claim by amendment after filing.

The embodiments according to the present invention may be implemented by various means, for example, hardware, firmware, software, or a combination thereof. In the case of implementation by hardware, an embodiment of the present invention may be implemented by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In the case of implementation by firmware or software, an embodiment of the present invention may be implemented in the form of a module, procedure, or function that performs the functions or operations described above. Software code may be stored in a memory and driven by a processor. The memory may be located inside or outside the processor, and may exchange data with the processor through various known means.

It is obvious to those skilled in the art that the present invention may be embodied in other specific forms without departing from the essential features of the present invention. Therefore, the detailed description described above should not be construed as restrictive in all respects and should be considered as illustrative. The scope of the present invention should be determined by rational interpretation of the appended claims, and all adjustments within the equivalent scope of the present invention are included in the scope of the present invention.

MODES FOR IMPLEMENTATION OF THE INVENTION

It is understood by those skilled in the art that various adjustments and modifications are possible in the present invention without departing from the spirit or scope of the present invention. Accordingly, the present invention is intended to cover adjustments and modifications of the present invention provided within the appended claims and their equivalents.

In the present specification, both apparatus and method inventions are mentioned, and descriptions of both apparatus and method inventions may be applied to complement each other.

Various embodiments have been described in the best mode for carrying out the present invention.

INDUSTRIAL AVAILABILITY

The present invention may be used in a series of games and entertainment fields.

It is obvious to those skilled in the art that various adjustments and modifications are possible in the present invention without departing from the spirit or scope of the present invention. Accordingly, the present invention is intended to cover adjustments and modifications of the present invention provided within the appended claims and their equivalents.

What is claimed is:

1. A method for controlling a gaming virtual space configured by a game application executed by a computer device, the method comprising:
   providing the gaming virtual space to at least one client account, which is used by a client device to access the game application, and allocating a location in the gaming virtual space to a game character corresponding to the at least one client account;
   setting a safe area in the gaming virtual space to be a first safe area having a first limiting border, wherein when the game character is located outside the safe area, additional damage is applied to the game character;
   predetermining a minimum number of surviving game characters and a maximum number of the surviving game characters;
   indicating the first safe area to the at least one client account;
   determining whether both the predetermined minimum number of the surviving game characters and the predetermined maximum number of the surviving game characters are set;
   determining whether the number of the surviving game characters is not included in a predetermined range between the predetermined minimum number of the surviving game characters and the predetermined maximum number of the surviving game characters;
   in response to determinations that the both the predetermined minimum number and the predetermined maximum number are set, and that the number of the surviving game characters is included in the predetermined range, adjusting the safe area from the first safe area to be a second safe area having a second limiting border, by performing:

showing the first limiting border of the first safe area during a first predetermined delay time;

after the first predetermined delay time is elapsed, showing both the first limiting border of the first safe area and the second limiting border of the second safe area, during a first predetermined waiting time;

after the first predetermined waiting time is elapsed, moving the first limiting border of the first safe area to the second limiting border of the second safe area, during a first predetermined moving time; and after the first predetermined moving time is elapsed, aligning the first limiting border of the first safe area with the second limiting border of the second safe area;

in response to determinations that the both the predetermined minimum number and the predetermined maximum number are set, and that the number of the surviving game characters is not included in the predetermined range, adjusting the safe area from the first safe area to be a third safe area having a third limiting border, by performing:

showing the first limiting border of the first safe area during a second predetermined delay time;

after the second predetermined delay time is elapsed, showing both the first limiting border of the first safe area and the third limiting border of the third safe area, during a second predetermined waiting time;

after the second predetermined waiting time is elapsed, moving the first limiting border of the first safe area to the third limiting border of the third safe area, during a second predetermined moving time; and after the second predetermined moving time is elapsed, aligning the first limiting border of the first safe area with the third limiting border of the third safe area, wherein the third safe area corresponds to another predetermined range encompassing the number of surviving game characters; and adjusting at least one of the first predetermined waiting time, the first predetermined delay time, the first predetermined moving time, the second predetermined waiting time, the second predetermined delay time and the second predetermined moving time, based on a number of surviving game characters and at least one of the predetermined maximum number of the surviving game characters and the predetermined minimum number of the surviving game characters.

2. The method of claim 1, further comprising:
decreasing at least one of the first predetermined waiting time, the first predetermined delay time, the first predetermined moving time, the second predetermined waiting time, the second predetermined delay time and the second predetermined moving time, in response to a determination that the number of the surviving game characters is less than the predetermined minimum number of the surviving game characters.

3. The method of claim 1, further comprising:
increasing at least one of the first predetermined moving time and the second predetermined moving time, in response to a determination that the number of the surviving game characters exceeds the predetermined maximum number of the surviving game characters.

4. The method of claim 1, wherein the third limiting border is located based on the first limiting border.

5. The method of claim 4, wherein the third limiting border is located within an outer margin that shares a center with the first limiting border.

6. The method of claim 1, wherein the adjusting at least one of the predetermined waiting time, the predetermined delay time and the predetermined moving time comprises:
adjusting the predetermined waiting time, the predetermined delay time and the predetermined moving time to be a dynamic delay time, a dynamic waiting time, or a dynamic reduction time,
wherein the dynamic delay time, the dynamic waiting time, or the dynamic reduction time is calculated based on a density value outside an appropriate survivor density range is used.

7. The method of claim 6, wherein the dynamic delay time, the dynamic waiting time, or the dynamic reduction time is adjusted proportionally to an amount that the density value is outside the appropriate survivor density range.

8. The method of claim 1, wherein the second predetermined moving time is a sum of the first predetermined moving time and a third moving time, and
wherein the third moving time is a time set for moving the second limiting border of the second safe area to the third limiting border of the third safe area.

9. An apparatus for controlling a gaming virtual space configured by a game application executed by the apparatus, the apparatus comprising:
a communicator configured to transmit and receive data to or from an external apparatus;
a storage configured to store game-related data; and
a processor configured to control the communicator and the storage,
wherein the processor is further configured to perform:
providing the gaming virtual space to at least one client account, which is used by a client device to access the game application, and allocating a location in the gaming virtual space to a game character corresponding to the at least one client account;
setting a safe area in the gaming virtual space to be a first safe area having a first limiting border, wherein when the game character is located outside the safe area, additional damage is applied to the game character;
predetermining a minimum number of surviving game characters and a maximum number of the surviving game characters;
indicating the first safe area to the at least one client account;
determining whether both the predetermined minimum number of the surviving game characters and the predetermined maximum number of the surviving game characters are set;
determining whether the number of the surviving game characters is not included in a predetermined range between the predetermined minimum number of the surviving game characters and the predetermined maximum number of the surviving game characters;
in response to determinations that the both the predetermined minimum number and the predetermined maximum number are set, and that the number of the surviving game characters is included in the predetermined range, adjusting the safe area from the first safe area to be a second safe area having a second limiting border, by performing:
showing the first limiting border of the first safe area during a first predetermined delay time;
after the first predetermined delay time is elapsed, showing both the first limiting border of the first safe area and the second limiting border of the second safe area, during a first predetermined waiting time;

after the first predetermined waiting time is elapsed, moving the first limiting border of the first safe area to the second limiting border of the second safe area, during a first predetermined moving time; and after the first predetermined moving time is elapsed, aligning the first limiting border of the first safe area with the second limiting border of the second safe area;

in response to determinations that the both the predetermined minimum number and the predetermined maximum number are set, and that the number of the surviving game characters is not included in the predetermined range, adjusting the safe area from the first safe area to be a third safe area having a third limiting border, by performing:

showing the first limiting border of the first safe area during a second predetermined delay time;

after the second predetermined delay time is elapsed, showing both the first limiting border of the first safe area and the third limiting border of the third safe area, during a second predetermined waiting time;

after the second predetermined waiting time is elapsed, moving the first limiting border of the first safe area to the third limiting border of the third safe area, during a second predetermined moving time; and after the second predetermined moving time is elapsed, aligning the first limiting border of the first safe area with the third limiting border of the third safe area, wherein the third safe area corresponds to another predetermined range encompassing the number of surviving game characters; and adjusting at least one of the first predetermined waiting time, the first predetermined delay time, the first predetermined moving time, the second predetermined waiting time, the second predetermined delay time and the second predetermined moving time, based on a number of surviving game characters and at least one of the predetermined maximum number of the surviving game characters and the predetermined minimum number of the surviving game characters.

10. The apparatus of claim 9, wherein the processor is further configured to perform:

decreasing at least one of the first predetermined waiting time, the first predetermined delay time, the first predetermined moving time, the second predetermined waiting time, the second predetermined delay time and the second predetermined moving time, in response to a determination that the number of the surviving game characters is less than the predetermined minimum number of the surviving game characters.

11. The apparatus of claim 9, wherein the processor is further configured to perform:

increasing at least one of the first predetermined moving time and the second predetermined moving time, in response to a determination that the number of the surviving game characters exceeds the predetermined maximum number of the surviving game characters.

\* \* \* \* \*